(12) United States Patent
Fujita

(10) Patent No.: US 10,185,521 B2
(45) Date of Patent: Jan. 22, 2019

(54) IMAGE FORMING APPARATUS THAT CONTROLS POWER SUPPLY BASED ON RESULT DETECTED BY HUMAN SENSOR

(71) Applicant: KYOCERA Document Solutions Inc., Osaka (JP)

(72) Inventor: Hiroyuki Fujita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 8 days.

(21) Appl. No.: 15/547,181

(22) PCT Filed: May 25, 2016

(86) PCT No.: PCT/JP2016/065490
§ 371 (c)(1),
(2) Date: Jul. 28, 2017

(87) PCT Pub. No.: WO2016/190363
PCT Pub. Date: Dec. 1, 2016

(65) Prior Publication Data
US 2018/0032290 A1  Feb. 1, 2018

(30) Foreign Application Priority Data
May 26, 2015 (JP) ................... 2015-106444

(51) Int. Cl.
*G06F 15/00* (2006.01)
*G06F 3/12* (2006.01)
(Continued)

(52) U.S. Cl.
CPC ............ *G06F 3/1221* (2013.01); *B41J 29/38* (2013.01); *B41J 29/393* (2013.01); *G03G 15/5004* (2013.01); *G03G 15/5016* (2013.01); *G03G 15/5091* (2013.01); *G03G 21/14* (2013.01); *G03G 21/1882* (2013.01); *G06F 3/12* (2013.01); *G06F 3/1236* (2013.01); *G06F 3/1292* (2013.01); *H04N 1/00* (2013.01);
(Continued)

(58) Field of Classification Search
CPC .... G06F 3/1221; G06F 3/1236; G06F 3/1292; G03G 15/5004; G03G 15/5016; G03G 21/1882; H04N 1/00888
USPC ............................... 358/1.1, 1.15, 1.13, 1.14
See application file for complete search history.

(56) References Cited

U.S. PATENT DOCUMENTS

2016/0142575 A1* 5/2016 Yokoyama ......... H04N 1/00896
358/1.15
2016/0142576 A1* 5/2016 Yamaguchi ........ H04N 1/00891
358/1.13

FOREIGN PATENT DOCUMENTS

JP         2000-141821 A     5/2000

* cited by examiner

*Primary Examiner* — Douglas Tran
(74) *Attorney, Agent, or Firm* — Studebaker & Brackett PC

(57) ABSTRACT

An image forming apparatus (100) includes a human sensor (10), an image forming section (20), an internal sensor (30), a power supply section (40), a controller (50), and a communication section (60). The internal sensor (30) includes a first internal sensor (31) and a second internal sensor (32). The first internal sensor (31) detects a quantity that varies by operation of the image forming section (20). The second internal sensor (32) detects a state of operation of the image forming section (20). In a power saving state, the controller (50) controls, based on a result detected by the human sensor (10), the power supply section (40) to supply electric power to the first internal sensor (31) and not to supply electric power to the second internal sensor (32).

12 Claims, 6 Drawing Sheets

(51) Int. Cl.
 *G06K 1/00* (2006.01)
 *B41J 29/38* (2006.01)
 *G03G 21/14* (2006.01)
 *H04N 1/00* (2006.01)
 *G03G 15/00* (2006.01)
 *G03G 21/18* (2006.01)
 *B41J 29/393* (2006.01)

(52) U.S. Cl.
 CPC ....... *H04N 1/00888* (2013.01); *G03G 15/556* (2013.01); *Y02D 10/1592* (2018.01)

IMAGE FORMING APPARATUS THAT CONTROLS POWER SUPPLY BASED ON RESULT DETECTED BY HUMAN SENSOR

TECHNICAL FIELD

The present invention relates to an image forming apparatus.

BACKGROUND ART

There has been known an image forming apparatus that has a normal mode and a power saving mode. The image forming apparatus is operational in the normal mode. In the power saving mode, the image forming apparatus consumes less electric power than in the normal mode (for example, Patent Literature 1), In a power saving printer (image forming apparatus) described in Patent Literature 1, When an apparatus state acquisition request is received from an external device while the printer is in a power saving mode, apparatus state information stored in a storage before the printer entered the power saving mode is read and given to the external device. Therefore, even when the apparatus state acquisition request is received from the external device, the power saving printer described in Patent Literature 1 maintains the power saving mode and saves electric power consumption.

CITATION LIST

Patent Literature

[Patent Literature 1]
Japanese Patent Application Laid-Open Publication No. 2000-141821

SUMMARY OF INVENTION

Technical Problem

However, the power saving printer described in Patent Literature 1 reads out the apparatus state information stored in the storage before the printer enters the power saving mode. Therefore, the read apparatus state information may differ from the latest apparatus state information, that is, information of a state of the apparatus at the time when the apparatus state acquisition request is received.

The present invention was made in view of the above problem, and it is an object of the present invention to provide an image forming apparatus capable of reading the latest apparatus information thereof by restricting an increase in electric power consumption in a power saving mode.

Solution to Problem

An image forming apparatus according to the present invention is capable of communicating with an external device via a network. The image forming apparatus operates by switching between a first power state and a power saving state. Electric power consumption is lower in the power saving state than in the first power state. The image forming apparatus includes a human sensor, an image forming section, an internal sensor, a power supply section, a controller, and a communication section. The human sensor detects whether a person is present or absent within a predetermined area. The image forming section forms an image on a recording medium. The internal sensor detects a state of the image forming section. The power supply section supplies electric power to the internal sensor. The controller controls the image forming section and the power supply section. The communication section communicates with the external device. The internal sensor includes a first internal sensor and a second internal sensor. The first internal sensor detects a quantity that varies by operation of the image forming section. The second internal sensor detects a state of operation of the image forming section. The communication section communicates a result detected by the first internal sensor to the external device. In the power saving state, the controller controls, based on a result detected by the human sensor, the power supply section to supply electric power to the first internal sensor and not to supply electric power to the second internal sensor.

Advantageous Effects of Invention

According to the present invention, the latest apparatus information of the image forming apparatus can be read by restricting an increase in electric power consumption,

DESCRIPTION OF EMBODIMENTS

Figure 1:
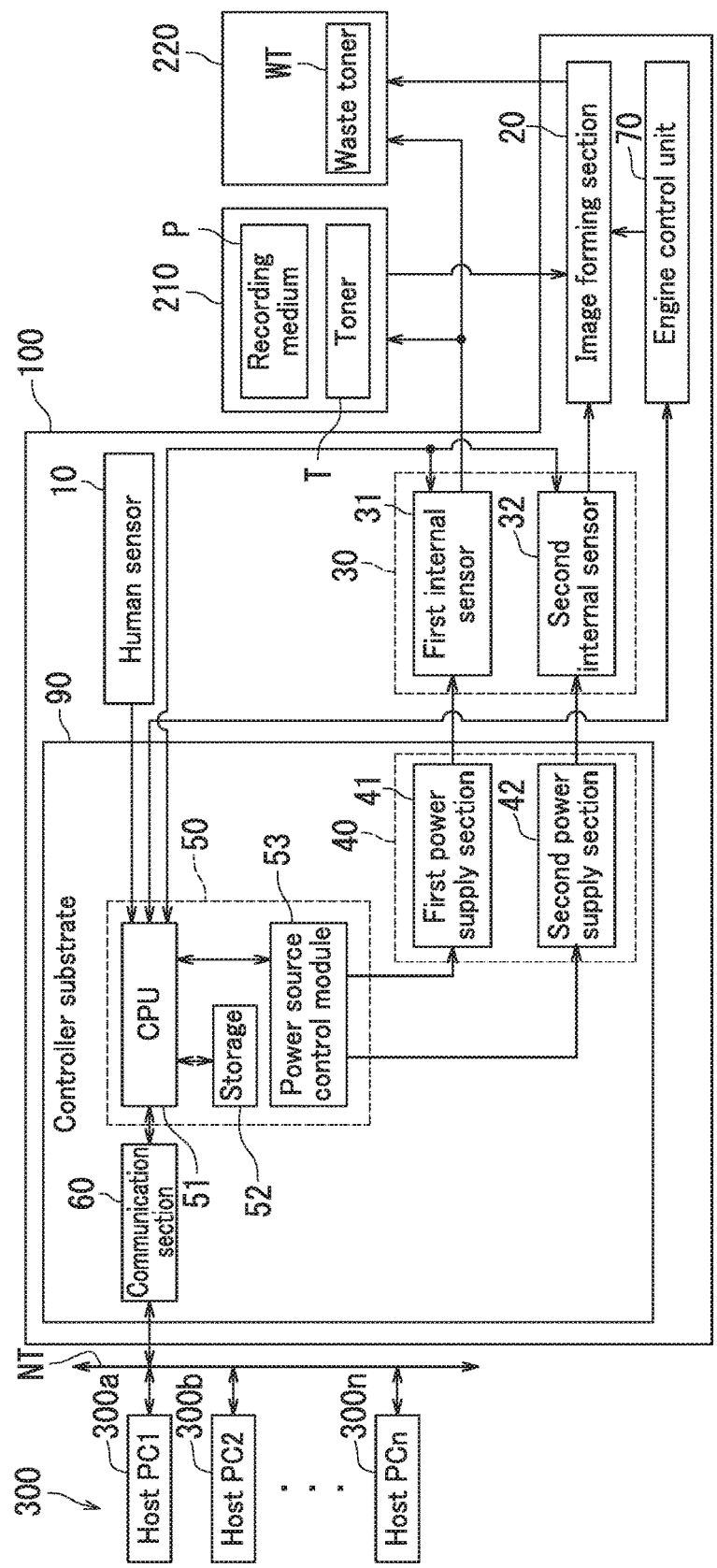
FIG. 1 is a block diagram of an image forming apparatus according to an embodiment of the present invention.

The following describes embodiments of the present invention with reference to the drawings. Note that in the drawings, elements that are the same or substantially equivalent are labelled using the same reference signs and explanation thereof will not be repeated.

An image forming apparatus 100 according to an embodiment of the present invention will be described with reference to FIG. 1. FIG. 1 is a block diagram of the image forming apparatus 100 according to the embodiment of the present invention.

As illustrated in FIG. 1, the image forming apparatus 100 includes a human sensor 10, an image forming section 20, an internal sensor 30, a power supply section 40, a controller 50, a communication section 60, and an engine control unit 70. The image forming apparatus 100 may be a copier, a printer, a facsimile machine, or a multifunction peripheral having functions of these apparatuses. The image forming apparatus 100 is capable of communicating with a plurality of external devices 300 via a network NT. The plurality of external devices 300 include an external device 300a, an external device 300b, and an external device 300n. The external devices 300 each are for example a host personal computer. The power supply section 40, the controller 50, and the communication section 60 are mounted on a controller substrate 90. The image forming apparatus 100 operates by switching its power state between a normal state (first power state) and a power saving state in which electric power consumption is lower than in the normal state.

The human sensor 10 is for example a pyroelectric sensor. The human sensor 10 detects infrared rays emitted from a human body to detect whether a person is present or absent within a predetermined area.

The image forming section 20 forms an image on a recording medium P.

The internal sensor 30 detects a state of the image forming section 20. The internal sensor 30 includes a first internal sensor 31 and a second internal sensor 32. The first internal sensor 31 detects a quantity that varies by operation of the image forming section 20. Specifically, the first internal sensor 31 detects a quantity of a feed material 210 fed to the image forming section 20. Examples of the feed material 210 include the recording medium P and a toner T. The first internal sensor 31 also detects a quantity of a discharged material 220 discharged from the image forming section 20. Examples of the discharged material 220 include a waste toner WT.

The second internal sensor 32 detects a state of operation of the image forming section 20. For example, the second internal sensor 32 detects a state of conveyance of the recording medium P in the image forming section 20.

The power supply section 40 supplies electric power to the internal sensor 30. The power supply section 40 includes a first power supply section 41 and a second power supply section 42. The first power supply section 41 supplies electric power to the first internal sensor 31. The second power supply section 42 supplies electric power to the second internal sensor 32.

The controller 50 controls the image forming section 20 and the power supply section 40. The controller 50 includes a central processing unit (CPU) 51, a storage 52, and a power source control module 53.

The CPU 51 controls overall image processing performed on image data. The image data is for example image data acquired through an image reading section or image data transmitted from any of the external devices 300 via the network NT. The CPU 51 controls a shift of the power state of the image forming apparatus 100. For example, when the image forming apparatus 100 has been out of operation for more than a predetermined time period while the power state of the image forming apparatus 100 is the normal state, the CPU 51 instructs the power source control module 53 to shift the power state of the image forming apparatus 100 from the normal state to the power saving state. Further, for example when a request for image formation is received from a user while the power state of the image forming apparatus 100 is the power saving state, the CPU 51 instructs the power source control module 53 to shift the power state of the image forming apparatus 100 from the power saving state to the normal state.

The storage 52 includes a read only memory (ROM) device and a random access memory (RAM) device. The storage 52 stores various programs therein. Further, the storage 52 stores therein a result detected by the first internal sensor 31. Specifically, the storage 52 stores therein information indicating a residual quantity of recording mediums P, information indicating a residual quantity of the toner T, and information indicating whether a waste-toner container accommodating the waste toner WT is filled or not. In the present description, the information indicating whether the waste-toner container accommodating the waste toner WT is filled or not may be referred to as waste-toner fill state information. Also, in the present description, the information indicating a residual quantity of the recording mediums P, the information indicating a residual quantity of the toner T, and the waste-toner fill state information may be referred to as apparatus information.

The power source control module 53 controls electric power supply by the power supply section 40 in response to instruction from the CPU 51 to shift the power state of the image forming apparatus 100. Specifically, when the CPU 51 instructs the power source control module 53 to shift the power stale from the normal state to the power saving state, the power source control module 53 controls the first power supply section 41 to stop electric power supply to the first internal sensor 31 and controls the second power supply section 42 to stop electric power supply to the second internal sensor 32. Also, when the CPU 51 instructs the power source control module 53 to shift the power state from the power saving state to the normal state, the power source control module 53 controls the first power supply section 41 to supply electric power to the first internal sensor 31 and controls the second power supply section 42 to supply electric power to the second internal sensor 32.

The communication section 60 communicates with the external devices 300. The communication section 60 communicates a result detected by the first internal sensor 31 to the external devices 300. Specifically, when a request for acquiring apparatus information of the image forming apparatus 100 is received from any of the external devices 300, the communication section 60 communicates the apparatus information to the external device 300.

When the image forming apparatus 100 is in the normal state, electric power is supplied to the human sensor 10, the image forming section 20, the internal sensor 30, the power supply section 40, the controller 50, the communication section 60, and the engine control unit 70. In the power saving state, electric power supply to the internal sensor 30 and the power supply section 40 is stopped.

When the human sensor 10 detects presence of a person within a predetermined area, that is, when a person comes near the image forming apparatus 100, the apparatus information may vary. For example, a residual quantity of the recording mediums P or a residual quantity of the toner T may vary as a result of the person who comes near the image forming apparatus 100 replenishing the recording mediums P or the toner T. Alternatively, the waste-toner fill state information may vary as a result of replacement of the waste toner container.

When the image forming apparatus 100 is in the power saving state, the controller 50 controls, based on a result detected by the human sensor 10, the power supply section 40 to supply electric power to the first internal sensor 31 and not to supply electric power to the second internal sensor 32. Specifically, when the human sensor 10 detects presence of a person within a predetermined area in the power saving state, the controller 50 controls the first power supply section 41 to supply electric power to the first internal sensor 31 and controls the second power supply section 42 not to supply electric power to the second internal sensor 32. Further, the controller 50 controls the storage 52 to store therein a result (that is, apparatus information) detected by the first internal sensor 31. Therefore, the apparatus information can be updated to latest information when a person comes near the image forming apparatus 100 in the power saying state.

When a request for acquiring the apparatus information is received from any of the external devices 300 after the apparatus information is updated to latest information, the controller 50 controls the storage 52 and the communication section 60 such that the communication section 60 communicates the apparatus information stored in the storage 52 to the external device 300.

As described above with reference to FIG. 1, in the power saving state, the controller 50 of the image forming apparatus 100 controls, based on a result detected by the human sensor 10, the power supply section 40 to supply electric power to the first internal sensor 31 and not to supply electric power to the second internal sensor 32. Therefore, when a person comes near the image forming apparatus 100, electric power is supplied only to the first internal sensor 31 that detects a quantity necessary for updating the apparatus information. As a result, the image forming apparatus 100 can read out the latest apparatus information thereof by restricting an increase in electric power consumption.

The human sensor 10 is a pyroelectric sensor. Therefore, an increase in electric power consumption can be restricted.

Figure 2:
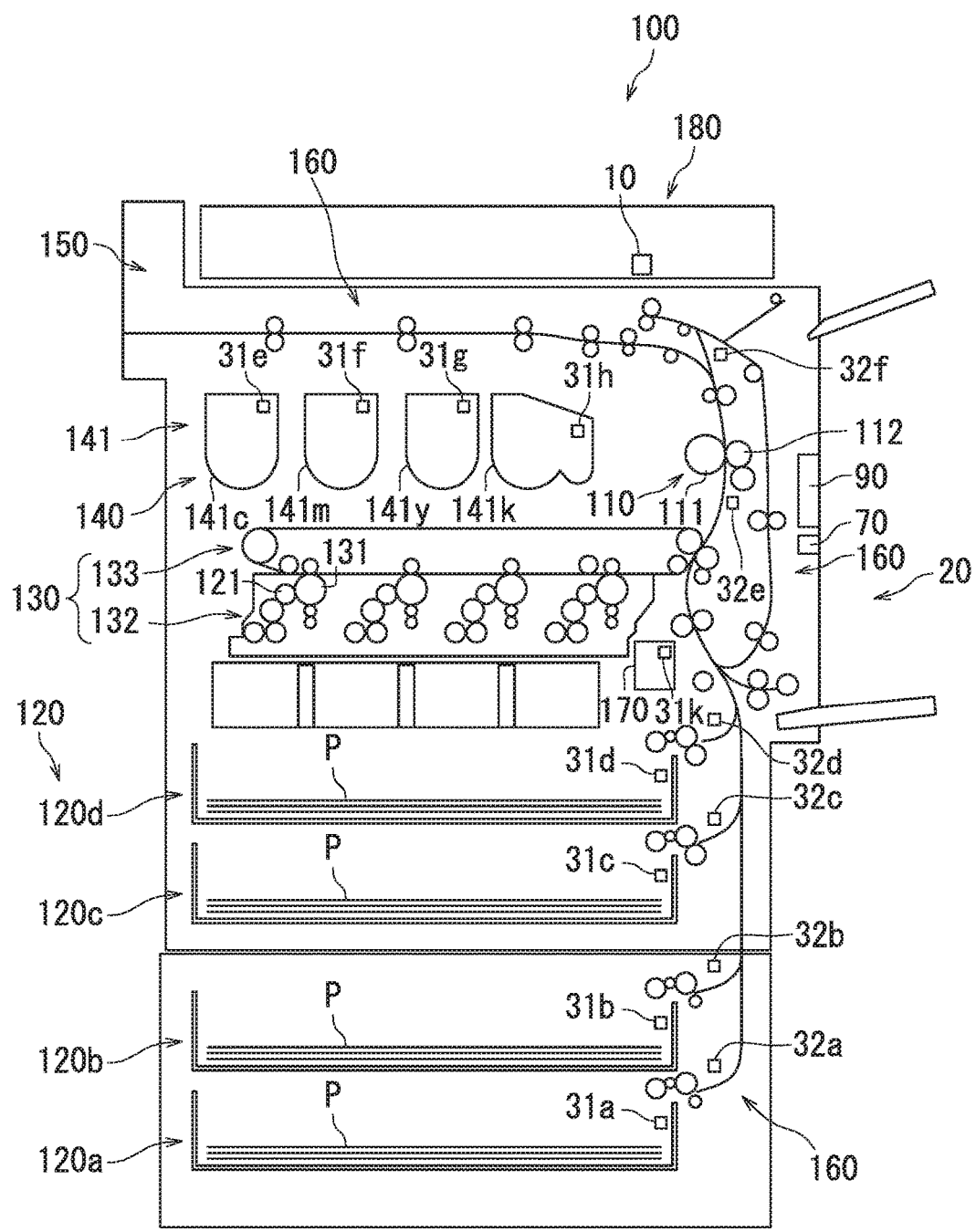
FIG. 2 is a schematic illustration of the image forming apparatus according to the embodiment of the present invention.

The following describes more details about the image forming apparatus 100 according to the embodiment of the present invention with reference to FIGS. 1 and 2. FIG. 2 is a schematic illustration of the image forming apparatus 100 according to the embodiment of the present invention.

As illustrated in FIG. 2, the image forming apparatus 100 includes the image forming section 20, first internal sensors 31a to 31h and 31k, second internal sensors 32a to 32f, the engine control unit 70, the controller substrate 90, and an image reading section 180. The power supply section 40, the controller 50, and the communication section 60 are mounted on the controller substrate 90 (see FIG. 1). The image forming section 20 includes a fixing device 110, a paper feed unit 120, an imaging section 130, a toner replenishment unit 140, a paper ejecting section 150, a paper conveyance section 160, and a waste toner container 170. The image forming section 20 forms an image on a recording medium P.

Recording mediums P to be used for printing are accommodated in the paper feed unit 120. The paper feed unit 120 includes paper feed cassettes 120a, 120b, 120c, and 120d. During printing, a recording medium P in the paper feed unit 120 is conveyed by the paper conveyance section 160 to be ejected from the paper ejecting section 150 via the imaging section 130 and the fixing device 110.

The imaging section 130 forms a toner image on the recording medium P. The imaging section 130 includes a photosensitive member 131, a developing device 132, and a transfer device 133.

An electrostatic latent image is formed on the photosensitive member 131 for example by a laser beam. The laser beam is emitted based on an electronic signal about a document image generated by the image reading section 180. The developing device 132 includes a development roller 121. The development roller 121 develops the electrostatic latent image by supplying a toner T to the photosensitive member 131 to form a toner image on the photosensitive member 131.

Four toner cartridges (toner accommodation sections) 141 (141c, 141m, 141y, and 141k) corresponding to respective four colors are provided in the toner replenishment unit 140. A cyan toner T is accommodated in the toner cartridge 141c for a cyan color. A magenta toner T is accommodated in the toner cartridge 141m for a magenta color. A yellow toner T is accommodated in the toner cartridge 141y for a yellow color. A black toner T is accommodated in the toner cartridge 141k for a black color. The toners T of the respective colors are supplied from the respective toner cartridges 141 to the developing device 132.

The transfer device 133 transfers the toner image formed on the photosensitive member 131 to the recording medium P.

The fixing device 110 applies heat and pressure to the recording medium P using a fixing member 111 and a pressure member 112 to melt the unfixed toner image formed by the imaging section 130 and fix the toner image on the recording medium P.

A waste toner WT is accommodated in the waste toner container 170. The waste toner WT is for example a toner remaining on the photosensitive member 131 after printing. The toner remaining on the photosensitive member 131 is removed by a cleaning device provided in a photosensitive member unit to fall to a waste-toner conveyance path and accommodated in the waste toner container 170.

The first internal sensors 31a to 31d detect residual quantities of the recording mediums P accommodated in the paper feed unit 120. The first internal sensor 31a detects a residual quantity of recording mediums P in the paper feed cassette 120a. The first internal sensor 31b detects a residual quantity of recording mediums P in the paper feed cassette 120b. The first internal sensor 31c detects a residual quantity of recording mediums P in the paper feed cassette 120c. The first internal sensor 31d detects a residual quantity of recording mediums P in the paper feed cassette 120d.

The first internal sensors 31e to 31h detect residual quantities of the toners T accommodated in the toner cartridges 141 (141c, 141m, 141y, and 141k). The first internal sensor 31e detects a residual quantity of the toner T in the toner cartridge 141c. The first internal sensor 31f detects a residual quantity of the toner T in the toner cartridge 141m. The first internal sensor 31g detects a residual quantity of the toner T in the toner cartridge 141y. The first internal sensor 31h detects a residual quantity of the toner T in the toner cartridge 141k.

The first internal sensor 31k detects whether the waste toner container 170 is filled with the waste toner WT or not.

The second internal sensors 32a to 32f are located in a conveyance path of the paper conveyance section 160. The second internal sensors 32a to 32f detect a state of operation of the image forming section 20. For example, the second internal sensors 32a to 32f detect a state of conveyance of the recording medium P in the image forming section 20.

When the human sensor 10 detects presence of a person within a predetermined area in the power saving state, the controller 50 controls the power supply section 40 to supply electric power to the first internal sensors 31a to 31h and 31k and not to supply electric power to the second internal sensors 32a to 32f. Therefore, apparatus information of the image forming apparatus 100 can be updated to latest apparatus information by restricting an increase in electric power consumption.

Figure 3:
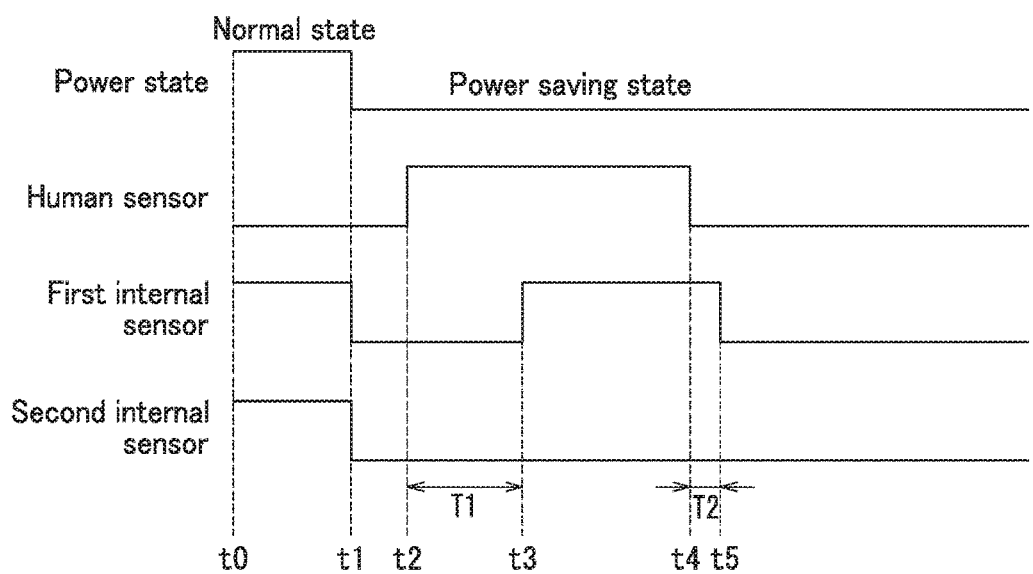
FIG. 3 is a timing diagram of electric power supply to a first internal sensor and a second internal sensor.

The following describes electric power supply in the image forming apparatus 100 according to the embodiment of the present invention with reference to FIGS. 1 and 3. FIG. 3 is a timing diagram illustrating electric power supply to the first internal sensor 31 and the second internal sensor 32. Specifically, FIG. 3 illustrates the power state of the image forming apparatus 100, output of the human sensor 10, a voltage supplied to the first internal sensor 31, and a voltage supplied to the second internal sensor 32.

As illustrated in FIG. 3, the power state of the image forming apparatus 100 is the normal state between time points t0 and t1. When the power state of the image forming apparatus 100 is the normal state, the controller 50 controls the first power supply section 41 to supply electric power to the first internal sensor 31 and controls the second power supply section 42 to supply electric power to the second internal sensor 32.

At the time point t1, the power state of the image forming apparatus 100 shifts from the normal state to the power saving state. When the power state of the image forming apparatus 100 is the power saving state, the controller 50 controls the first power supply section 41 not to supply electric power to the first internal sensor 31 and controls the second power supply section 42 not to supply electric power to the second internal sensor 32.

When a person comes near the image forming apparatus 100 at a time point t2, the human sensor 10 detects presence of the person within a predetermined area, As a result, output of the human sensor 10 increases to a high level. In the present description, a time point at which the human sensor 10 starts detecting presence of a person within the predetermined area may be referred to as a human detection start time. Here, the time point t2 is the human detection start time.

At a time point t3 at which the human sensor 10 has continued detecting the presence of the person within the predetermined area for at least a human detection determination period T1 from the human detection start time t2, the controller 50 controls the first power supply section 41 to supply electric power to the first internal sensor 31 and controls the second power supply section 42 not to supply electric power to the second internal sensor 32. A result detected by the first internal sensor 31 is stored in the storage 52.

When the person goes away from the image forming apparatus 100 at a time point t4, the human sensor 10 detects absence of the person within the predetermined area. As a result, output of the human sensor 10 decreases to a low level.

At a time point t5 at which a power supply stop period T2 has elapsed from the time point t4 at which the human sensor 10 detected absence of the person within the predetermined area, the controller 50 controls the first power supply section 41 to stop electric power supply to the first internal sensor 31.

As described above with reference to FIGS. 1 and 3. when the human sensor 10 continues detecting presence of a person within a predetermined area for at least the human detection determination period T1 from the human detection start time t2 in the power saving state, the controller 50 controls the power supply section 40 to supply electric power to the first internal sensor 31 and not to supply electric power to the second internal sensor 32. Therefore, for example, unintended detection of a person who comes near the image forming apparatus 100 but goes away immediately without doing any operation can be prevented. Also, unintended detection of a person who passes nearby the image forming apparatus 100 can be prevented. As a result, unnecessary electric power supply to the first internal sensor 31 is prevented to restrict an increase in electric power consumption.

It is preferable that a set value of the human detection determination period T1 is variable. For example, in a situation in which the image forming apparatus 100 faces an aisle, many people pass in front of the image forming apparatus 100. Therefore, unintended detection of passing people can be prevented by increasing the human detection determination period T1. By contrast, in a situation in which the image forming apparatus 100 is placed beside a wall or the like, few people pass in front of the image forming apparatus 100. Therefore, by decreasing the human detection determination period T1, electric power supply to the first internal sensor 31 can be started early to obtain an early response from the first internal sensor 31.

Further, the controller 50 controls the power supply section 40 to stop electric power supply to the first internal sensor 31 at the time point t5 at which the power supply stop period T2 has elapsed from the time point t4 at which the human sensor 10 detected absence of the person within the predetermined area. Therefore, even when it takes a time for the first internal sensor 31 to perform detection, the apparatus information can be detected accurately.

Also, when the human sensor 10 detects presence of a person within a predetermined area in the power saving state, the controller 50 controls the power supply section 40 to supply electric power to the first internal sensor 31 and not to supply electric power to the second internal sensor 32 during a time period from the detection of the presence of the person within the predetermined area by the human sensor 10 to detection of absence of the person within the predetermined area by the human sensor 10. Therefore, detection of the apparatus information by the first internal sensor 31 can be started early.

Although electric power supply to the first internal sensor 31 described above with reference to FIG. 3 is performed during the time period from the detection of the presence of the person within the predetermined area by the human sensor 10 to the detection of the absence of the person within the predetermined area by the human sensor 10, electric power may be supplied to the first internal sensor 31 after the human sensor 10 detects presence of the person within the predetermined area and thereafter detects absence of the person within the predetermined area.

Figure 4:
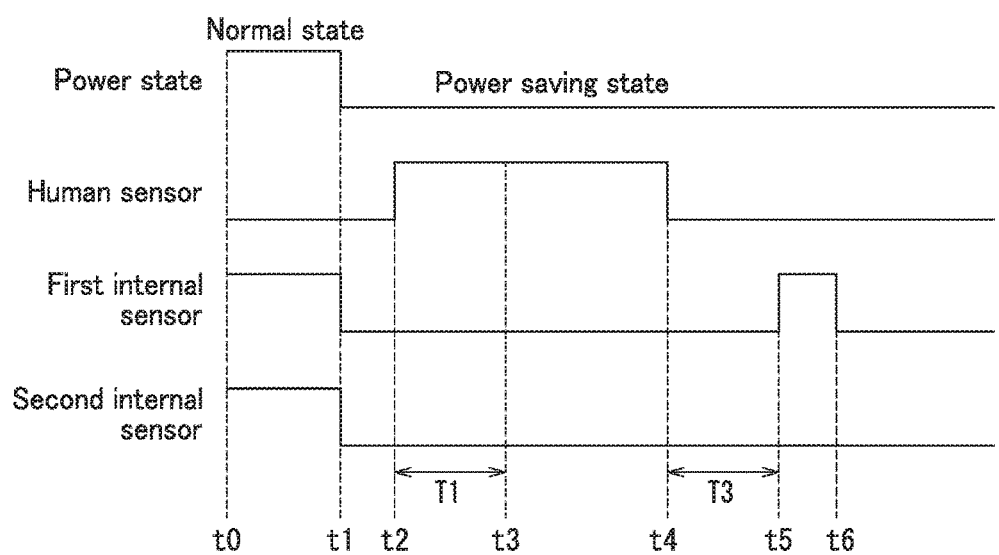
FIG. 4 is a timing diagram of electric power supply to the first internal sensor and the second internal sensor.

The following describes a variation of the electric power supply in the image forming apparatus 100 according to the embodiment of the present invention with reference to FIGS. 1 and 4. FIG. 4 is a timing diagram illustrating electric power supply to the first internal sensor 31 and the second internal sensor 32.

As illustrated in FIG. 4, the power state of the image forming apparatus 100 is the normal state between time points t0 and t1. When the power state of the image forming apparatus 100 is the normal state, the controller 50 controls the first power supply section 41 to supply electric power to the first internal sensor 31 and controls the second power supply section 42 to supply electric power to the second internal sensor 32.

At the time point t1, the power state of the image forming apparatus 100 shifts from the normal state to the power saving state. When the power state of the image forming apparatus 100 is the power saving state, the controller 50 controls the first power supply section 41 not to supply electric power to the first internal sensor 31 and controls the second power supply section 42 not to supply electric power to the second internal sensor 32.

When a person conies near the image forming apparatus 100 at a time point t2, the human sensor 10 detects presence of the person within a predetermined area. As a result, output of the human sensor 10 increases to a high level.

At a time point t3 at which the human sensor 10 has continued detecting the presence of the person within the predetermined area for at least the human detection determination period T1 from the human detection start time t2, the controller 50 determines that the apparatus information of the image forming apparatus 100 may have varied.

When the person goes away from the image forming apparatus 100 at a time point t4, the human sensor 10 detects absence of the person within the predetermined area. As a result, output of the human sensor 10 decreases to a low level.

At a time point t5 at which a power supply start period T3 has elapsed from the time point t4, the controller 50 controls the power supply section 40 to supply electric power to the first internal sensor 31 and not to supply electric power to the second internal sensor 32. Therefore, the first internal sensor 31 detects the apparatus information after the person goes away. As a result, a time period during which electric power is supplied to the first internal sensor 31 can be reduced to restrict an increase in electric power consumption.

Figure 5:
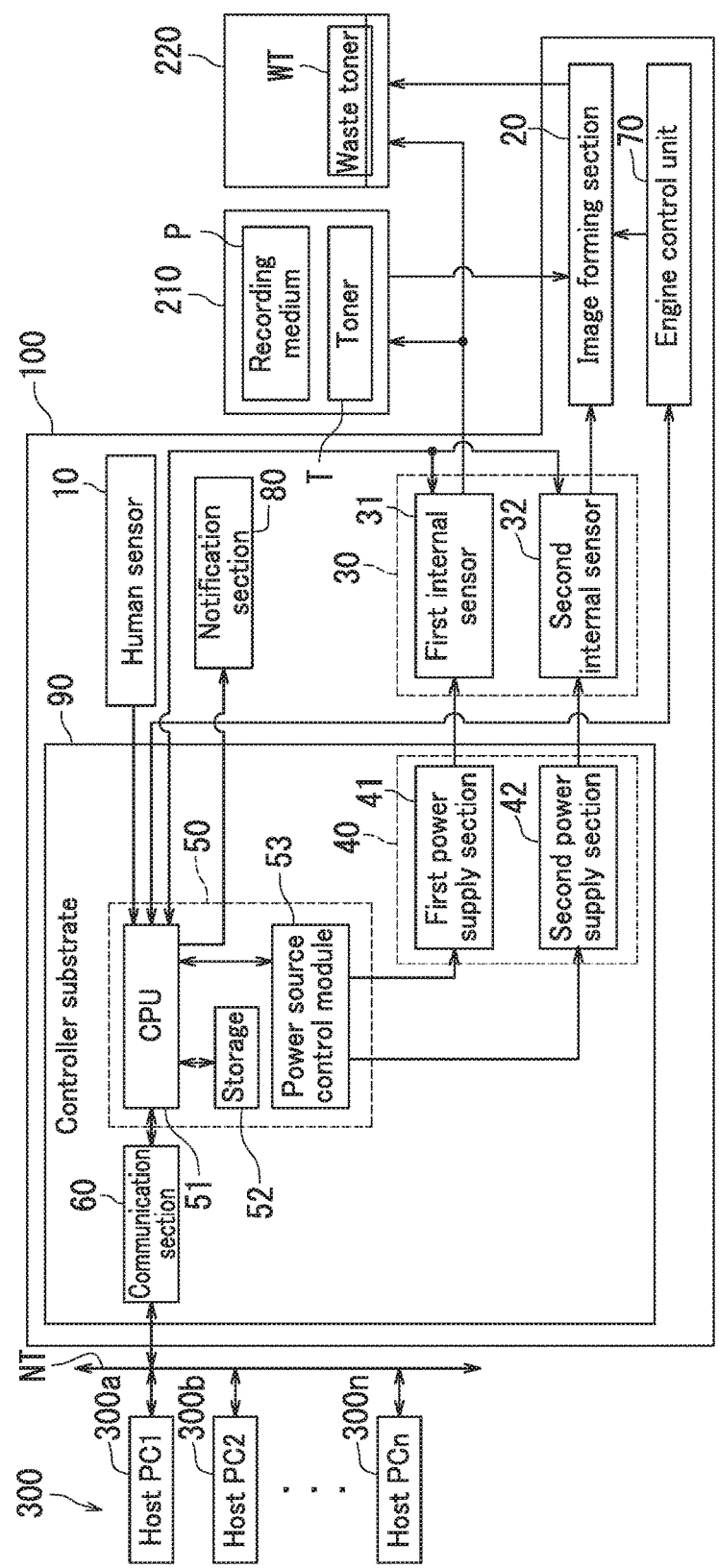
FIG. 5 is a block diagram of an image forming apparatus according to another embodiment of the present invention.
Figure 6:
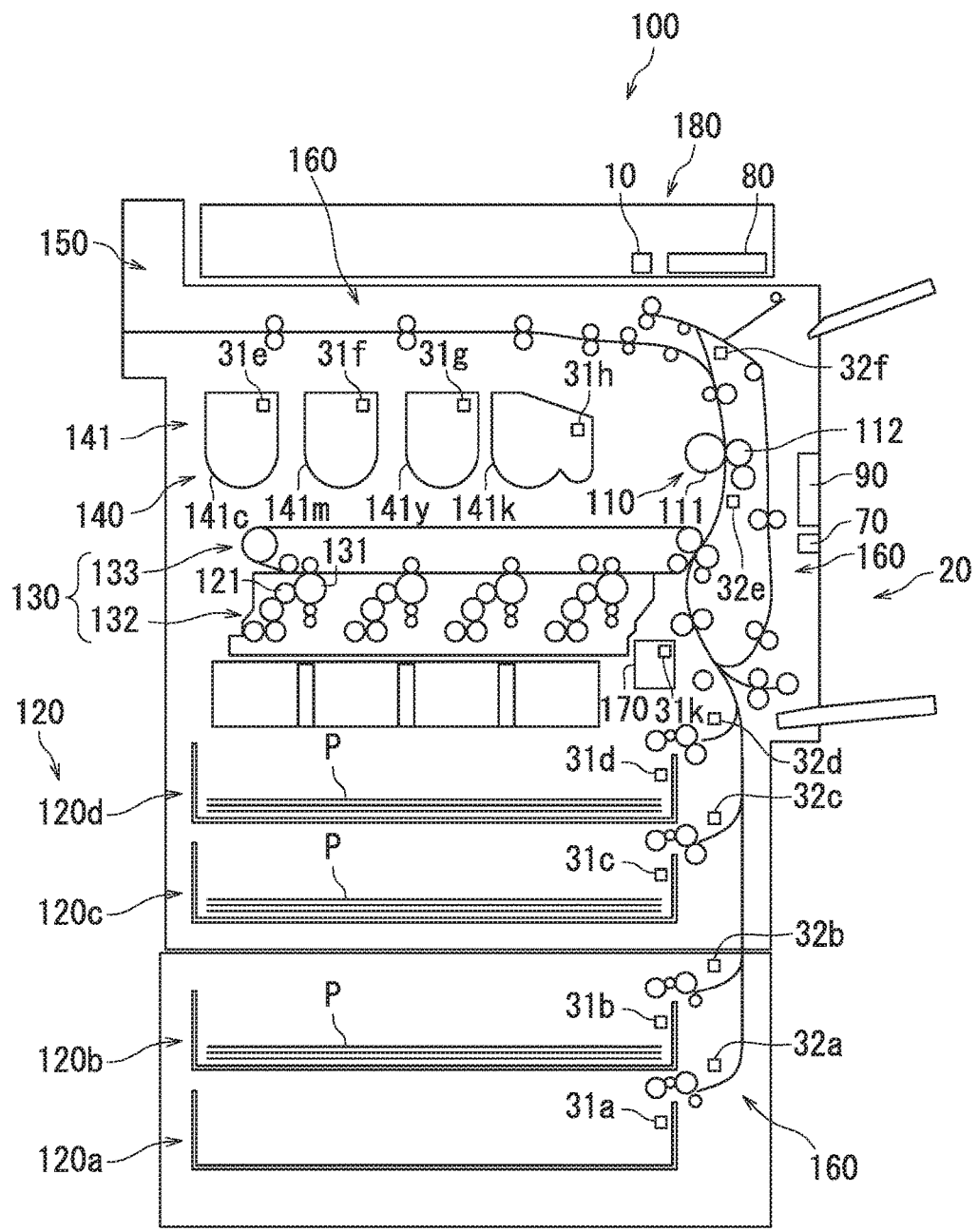
FIG. 6 is a schematic illustration of the image-forming apparatus according to the other embodiment of the present invention.

The following describes an image forming apparatus 100 according to another embodiment of the present invention with reference to FIGS. 5 and 6. FIG. 5 is a block diagram of the image forming apparatus 100 according to the other embodiment of the present invention. FIG. 6 is a schematic illustration of the image forming apparatus 100 according to the other embodiment of the present invention. The image forming apparatus 100 of the other embodiment has the same configuration as the image forming apparatus 100 described above with reference to FIGS. 1 and 2 except that the image forming apparatus 100 of the other embodiment further includes a notification section 80. Explanation of the same configuration will be omitted.

As described above, the image forming apparatus 100 further includes the notification section 80. The controller 50 determines whether or not a result detected by the first internal sensor 31 is within a predetermined range.

The notification section 80 is for example an operation panel. When a result detected by the first internal sensor 31 is outside the predetermined range upon detection of presence of a person within a predetermined area by the human sensor 10, the notification section 80 notifies the person. Specifically, when there are no recording mediums P in the paper feed cassette 120a as illustrated in FIG. 6, the notification section 80 notifies the person of the absence of the recording mediums P in the paper feed cassette 120a through display on the operation panel. Alternatively, the notification section 80 may notify the person of the absence of the recording mediums P in the paper feed cassette 120a using a buzzer. As described above, when the residual quantity of the recording mediums P or the toner T is zero or the waste toner container 170 is filled, the person can be advised to replenish the recording mediums P or the toner T or replace the waste toner container 170 by the notification section 80.

Through the above, the embodiments of the present invention have been described with reference to the drawings (FIGS. 1 to 6). However, it should be noted that the present invention is not limited to the above embodiments and is practicable in various manners within a scope not departing from the gist of the present invention (for example, as described below in sections (1) and (2)). The drawings schematically illustrate elements of configuration in order to facilitate understanding, and properties of elements of configuration illustrated in the drawings, such as thicknesses, lengths, and numbers thereof, may differ from actual properties thereof in order to facilitate preparation of the drawings. Furthermore, properties of the elements of configuration described in the above embodiments, such as materials, shapes, and dimensions, are merely examples and are not intended as specific limitations. Various alterations may be made so long as there is no substantial deviation from the effects of the present invention.

(1) Although in the embodiments of the present invention, the present invention is applied to an electrophotographic image forming apparatus, the present invention is also applicable to image forming apparatuses such as an inkjet image forming apparatus other than the electrophotographic image forming apparatus. In the case of the inkjet image forming apparatus, the first internal sensor 31 may detect a residual quantity of an ink instead of the residual quantity of the toner T and the waste-toner fill state information.

(2) Although in the embodiments of the present invention, the human sensor 10 is a pyroelectric sensor that detects infrared rays, the human sensor 10 is not limited to the pyroelectric sensor. The human sensor 10 may be a sensor that detects visible rays or ultrasonic waves.

The invention claimed is:

1. An image forming apparatus that is capable of communicating with an external device via a network and operates by switching between a first power state and a power saving state in which electric power consumption is lower than in the first power state, the image forming apparatus comprising:
   a human sensor configured to detect whether a person is present or absent within a predetermined area;
   an image forming section configured to form an image on a recording medium;
   an internal sensor configured to detect a state of the image forming section;
   a power supply section configured to supply electric power to the internal sensor;
   a controller configured to control the image forming section and the power supply section; and
   a communication section configured to communicate with the external device, wherein
   the internal sensor includes:
      a first internal sensor that detects a quantity that varies by operation of the image forming section; and
      a second internal sensor that detects a state of operation of the image forming section;
   the communication section communicates a result detected by the first internal sensor to the external device, and
   in the power saving state, the controller controls, based on a result detected by the human sensor, the power supply section to supply electric power to the first internal sensor and not to supply electric power to the second internal sensor.

2. The image forming apparatus according to claim 1, wherein
   when the human sensor continues detecting presence of the person within the predetermined area for at least a human detection determination period from a human detection start time in the power saving state, the controller controls the power supply section to supply electric power to the first internal sensor and not to supply electric power to the second internal sensor, the human detection start time being a time when the human sensor starts detecting the presence of the person within the predetermined area.

3. The image forming apparatus according to claim 2, wherein
   a set value of the human detection determination period is variable.

4. The image forming apparatus according to claim 1, wherein
   when the human sensor detects absence of the person within the predetermined area after detecting presence of the person within the predetermined area in the power saving state, the controller controls the power supply section to stop electric power supply to the first internal sensor at a time when an electric power supply stop period has elapsed from a time when the human sensor detects the absence of the person within the predetermined area.

5. The image forming apparatus according to claim 1, wherein upon detection of presence of the person within the predetermined area by the human sensor in the power saving state, the controller controls the power supply section to supply electric power to the first internal sensor and not to supply electric power to the second internal sensor during a time period from the detection of the presence to detection of absence of the person within the predetermined area by the human sensor.

6. The image forming apparatus according to claim 1, wherein when the human sensor detects presence of the person within the predetermined area in the power saving state, the controller controls the power supply section to supply electric power to the first internal sensor and not to supply electric power to the second internal sensor at a time when a power supply start period has elapsed from a time when the human sensor detects absence of the person within the predetermined area after the detection of the presence of the person within the predetermined area.

7. The image forming apparatus according to claim 1, wherein the controller includes a storage that stores therein the result detected by the first internal sensor.

8. The image forming apparatus according to claim 1 wherein the communication section communicates the result detected by the first internal sensor to the external device in response to a request from the external device.

9. The image forming apparatus according to claim 1. further comprising a notification section, wherein the controller determines Whether or not the result detected by the first internal sensor is within a predetermined range, and when the result detected by the first internal sensor is outside the predetermined range upon detection of presence of the person within the predetermined area by the human sensor, the controller notifies the person.

10. The image forming apparatus according to claim 1, Wherein the human sensor is a pyroelectric sensor.

11. The image forming apparatus according to claim further comprising a paper feed unit configured to accommodate one or more recording mediums, wherein the first internal sensor detects a residual quantity of the one or more recording mediums accommodated in the paper feed unit.

12. The image forming apparatus according to claim 1, further comprising a toner accommodation section configured to accommodate a toner, wherein the first internal sensor detects a residual quantity of the toner accommodated in the toner accommodation section.

* * * * *